US012371361B2

(12) United States Patent
Holmes et al.

(10) Patent No.: US 12,371,361 B2
(45) Date of Patent: Jul. 29, 2025

(54) SUBMERGED FEEDSTOCK CHARGING OF MELTING VESSELS

(71) Applicant: Owens-Brockway Glass Container Inc., Perrysburg, OH (US)

(72) Inventors: Kirk Holmes, Perrysburg, OH (US); Karin Gabriela Bastarrachea, Perrysburg, OH (US); David L. Duffy, Moorestown, NJ (US); Roy J. Houck, Tuckertown, NJ (US); Victor A. Plumbo, II, Ventnor City, NJ (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 503 days.

(21) Appl. No.: 17/490,844

(22) Filed: Sep. 30, 2021

(65) Prior Publication Data

US 2022/0098076 A1 Mar. 31, 2022

Related U.S. Application Data

(60) Provisional application No. 63/085,883, filed on Sep. 30, 2020.

(51) Int. Cl.
*C03B 3/00* (2006.01)
*C03B 5/235* (2006.01)
(Continued)

(52) U.S. Cl.
CPC ............ *C03B 3/005* (2013.01); *C03B 5/2356* (2013.01); *F27D 3/08* (2013.01); *F27D 25/00* (2013.01);
(Continued)

(58) Field of Classification Search
USPC .......................................................... 65/335
See application file for complete search history.

(56) References Cited

U.S. PATENT DOCUMENTS 1,834,631 A     12/1931   Mulholland
1,906,695 A  *   5/1933   Lufkin ...................... C03B 5/26
                                                            65/342
(Continued)

FOREIGN PATENT DOCUMENTS

CN      110398153 A  *  11/2019
EP        0395798 A1     11/1990
(Continued)

OTHER PUBLICATIONS

Cremer, Worm conveyors and screw conveyor segments (Year: 2019).*
(Continued)

*Primary Examiner* — Steven S Anderson, II
*Assistant Examiner* — Kurt J Wolford

(57) ABSTRACT

A melting furnace feedstock charger includes a charger conduit including an inlet to receive feedstock and an outlet at an outlet portion of the charger conduit to transmit feedstock, and an auger or other feedstock mover coupled to the charger conduit to convey feedstock in a direction from the inlet toward the outlet. A gate may be detachably coupled to the outlet portion of the charger conduit and configured to be coupled directly to a wall of a melting vessel. The auger may have a helical flight with an outer diameter of varying size. A stripper may be movably carried by the charger conduit and may include a stripping tool moved by an actuator with respect to the charger conduit to facilitate transmission of feedstock and/or to strip away clogged feedstock and/or molten material.

19 Claims, 7 Drawing Sheets

(51) Int. Cl.

| | | |
|---|---|---|
| *F27D 1/16* | (2006.01) | |
| *F27D 3/00* | (2006.01) | |
| *F27D 3/08* | (2006.01) | |
| *F27D 3/10* | (2006.01) | |
| *F27D 9/00* | (2006.01) | |
| *F27D 25/00* | (2010.01) | |

(52) U.S. Cl.
CPC ........ *C03B 2211/22* (2013.01); *F27D 1/1694* (2013.01); *F27D 2003/0075* (2013.01); *F27D 2003/105* (2013.01); *F27D 2009/0002* (2013.01); *F27D 2009/0013* (2013.01); *F27M 2001/07* (2013.01)

(56) References Cited

U.S. PATENT DOCUMENTS

| | | |
|---|---|---|
| 2,354,807 A | 8/1944 | Fox et al. |
| 3,725,022 A | 2/1973 | Mills |
| 4,350,512 A | 9/1982 | Krumwiede |
| 5,863,197 A * | 1/1999 | Boy ............. F28F 5/06 432/236 |
| 6,349,570 B1 | 2/2002 | Coates et al. |
| 8,573,006 B2 | 11/2013 | Macleod et al. |
| 8,783,068 B2 | 7/2014 | Macleod et al. |
| 9,394,192 B2 | 7/2016 | Villeroy De Galhau et al. |
| 9,643,869 B2 | 5/2017 | Shock et al. |
| 9,856,162 B2 | 1/2018 | Lindig et al. |
| 10,029,934 B2 | 7/2018 | Wang et al. |
| 10,118,852 B2 | 11/2018 | Wang et al. |
| 10,125,041 B2 | 11/2018 | Sorg et al. |
| 2008/0276652 A1 | 11/2008 | Bauer et al. |
| 2011/0098171 A1 | 4/2011 | Pedeboscq et al. |
| 2012/0070252 A1 | 3/2012 | Waltert |
| 2015/0013386 A1* | 1/2015 | Villeroy De Galhau ............. C03B 5/2353 65/335 |
| 2015/0307382 A1 | 10/2015 | Wang et al. |
| 2017/0203989 A1 | 7/2017 | Shock et al. |
| 2018/0002213 A1 | 1/2018 | Demott et al. |
| 2018/0029915 A1 | 2/2018 | Huber |
| 2018/0065877 A1* | 3/2018 | Faulkinbury ............. F23D 14/22 |
| 2018/0111866 A1 | 4/2018 | Macphee et al. |
| 2018/0244554 A1 | 8/2018 | Mighton et al. |
| 2019/0112214 A1 | 4/2019 | Sorg et al. |
| 2019/0161377 A1 | 5/2019 | Cowles et al. |
| 2019/0263701 A1 | 8/2019 | Shock et al. |
| 2019/0284079 A1* | 9/2019 | Wang ............. C03B 5/262 |
| 2022/0098078 A1 | 3/2022 | Rashley et al. |
| 2022/0098080 A1 | 3/2022 | Weil et al. |
| 2022/0098081 A1 | 3/2022 | Rausch et al. |

FOREIGN PATENT DOCUMENTS

| | | | |
|---|---|---|---|
| GB | 2114968 A | | 9/1983 |
| GB | 2471865 A | | 1/2011 |
| JP | 2013227166 A | * | 11/2013 |
| WO | 03086994 A1 | | 10/2003 |
| WO | 2015164694 A1 | | 10/2015 |
| WO | 2022072437 A2 | | 4/2022 |

OTHER PUBLICATIONS

Marks' Standard Handbook for Mechanical Engineers 10th Edition (Year: 1997).*
JP-2013227166-A English translation (Year: 2013).*
CN-110398153-A English translation (Year: 2019).*
Int. Search Report and Written Opinion, Int. Serial No. PCT/US2021/052930, Int. Filing Date: Sep. 30, 2021, Applicant: Owens-Brockway Glass Container Inc., Mail Date: Jan. 31, 2022.
Chilean Informe De Busqueda (Search Report), Serial No. 202300934, Applicant: Owens-Brockway Glass Container Inc., Dated: Sep. 2, 2024.
Chilean Informe Pericial (Expert Report0, Serial No. 202300934, Applicant: Owens-Brockway Glass Container Inc., Dated: Sep. 2, 2024.
Colombia Office Action, Application: NC2023/0005163, Applicant: Owens-Brockway Glass Container Inc., Dated: Jan. 9, 2025.
Chile Informe De Busqueda (Search Report), Application No. 202300934, Applicant: Owens-Brockway Glass Container Inc., Dated: Feb. 27, 2025.
Chile Respuesta Pericial (Expert Response), Application No. 202300934, Applicant: Owens-Brockway Glass Container Inc., Dated: Feb. 27, 2025.

* cited by examiner

SUBMERGED FEEDSTOCK CHARGING OF MELTING VESSELS

TECHNICAL FIELD

This patent application discloses innovations to material melting systems and, more particularly, to submerged charging of feedstock into melting vessels.

BACKGROUND

Material melting systems include feedstock or "batch" chargers, and melting furnaces having vessels to receive feedstock from the feedstock chargers and hold molten material and also having burners, electrodes, or other heating devices to melt the feedstock into the molten material. Such melting furnaces are used to melt metal, waste material, glass, and various other materials.

In glass manufacturing, raw glass materials are used to form a uniform composition of molten glass that can be subsequently processed into glass objects. The raw glass materials can include a variety of different chemical compositions (e.g., various oxides to form soda-lime-silica glass), and can be mixed with recycled glass ("cullet"). The raw glass materials and/or the cullet constitute feedstock or glass batch, which is typically delivered into a glass melting furnace by a glass batch charger, which receives loose glass batch from upstream equipment and then transmits the loose glass batch into the furnace. For example, in some glass melting furnaces, a batch charger reciprocally feeds piles of loose glass batch onto an exposed surface of molten glass in a furnace melter section, and the piles slowly drift away from the charger and submerge into the molten glass. A U.S. patent that illustrates a batch charger of this type is U.S. Pat. No. 8,783,068. In another example, involving a submerged combustion melting ("SCM") furnace, a batch charger continuously screw feeds loose glass batch beneath a free surface of molten glass and, thereafter, the batch melts and may rise within a melting section of the furnace. A U.S. patent that illustrates a batch charger of this type includes U.S. Pat. No. 9,822,027. Although such batch chargers are acceptable, challenges to batch charging remain.

BRIEF SUMMARY OF THE DISCLOSURE

In accordance with an embodiment of the present disclosure, a melting furnace feedstock charger includes a charger conduit including an inlet to receive feedstock and an outlet at an outlet portion of the charger conduit to transmit feedstock, an auger or other feedstock mover coupled to the charger conduit to convey feedstock in a direction from the inlet toward the outlet. In another embodiment, a gate may be detachably coupled to the outlet portion of the charger conduit and configured to be coupled directly to a wall of a melting vessel. In a further embodiment, the auger may have a helical flight with an outer diameter of varying size. In an additional embodiment, a stripper may be movably carried by the charger conduit and moved by an actuator with respect to the charger conduit to facilitate transmission of feedstock and/or to strip away clogged feedstock and/or molten material.

DETAILED DESCRIPTION

Several example embodiments will be described with reference to use in a glass manufacturing environment. However, it will be appreciated as the description proceeds that the presently disclosed subject matter is useful in many different applications and may be implemented in many other embodiments.

Submerged combustion melting (SCM) is a type of melting used in manufacturing of glass in which an air-fuel or oxygen-fuel mixture is injected directly into a pool of molten glass. SCM is also used in manufacturing metal, and other materials. As combustion gases bubble through the molten glass, they create a high-heat transfer rate and turbulent mixing of the molten glass until it achieves a uniform composition. A typical submerged combustion melter or furnace has a bottom with an outer wall, a refractory inner wall having an upper surface establishing a floor of the furnace, and a vertical burner passage extending through the inner and outer walls and being submerged in the molten glass. The typical melter also includes a burner extending into the burner passage.

With prevailing batch charging technology for SCM, glass batch materials are charged into a gas phase, or a gas atmosphere, above a free surface of molten glass within the melter, as opposed to being charged directly into the molten glass. It remains a challenge with SCM to engulf the raw glass materials and/or the cullet into the molten glass without causing dust and batch particulate carryover, due to charging the potentially partially dry materials into the melter in the turbulent gas phase. These particulates are typically filtered out with the use of bagging processes, and particulate control equipment, which is often large in size and expensive to obtain and operate. Adding water to wet the batch helps to limit the carryover, but increases the cost of operation, maintenance, and energy use.

In accordance with one aspect of the present disclosure, a feedstock charger is provided for a melting furnace to reduce risk of dust and batch particulate carryover in furnace exhaust. In accordance with another aspect of the present disclosure, a feedstock charger could eliminate batch water addition system/operation and reduce the need for filtration bagging process and particulate control equipment to deal with dust and batch particulate carryover in the furnace exhaust.

Figure 1:
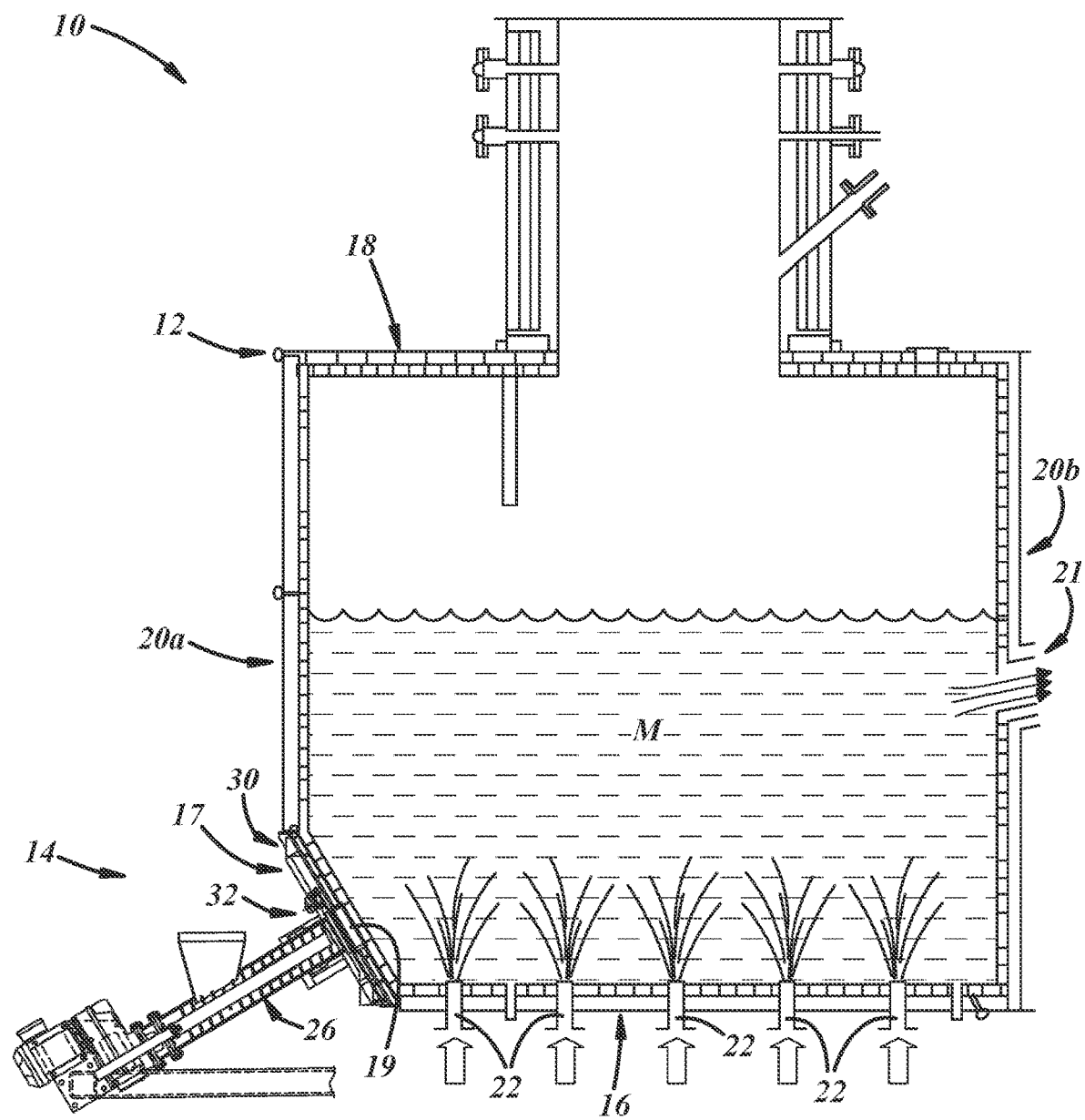
FIG. 1 is a fragmentary, sectional, elevational view of a material melting system according to an aspect of the present disclosure, and including a feedstock charger, and a melting furnace having a vessel to receive feedstock from the feedstock charger and melt the feedstock into molten material.

With specific reference to the drawing figures, FIG. 1 shows an illustrative embodiment of a melting furnace 10 including a melting vessel 12 and a feedstock (or batch) charger 14 to charge feedstock (or batch) into the melting vessel 12. The melting furnace 10 may be any type of melting furnace, for example, for melting glass, steel, aluminum, or any other suitable material.

The melting vessel 12 includes a bottom wall 16, a top wall 18, and one or more perimeter walls 20*a,b* (e.g. side walls, end walls, and/or the like) extending in a direction between the bottom wall 16 and the top wall 18. The melting vessel 12 also may include a corner wall 17 extending between the bottom wall 16 and a front perimeter wall 20*a*. The various walls of the melting vessel 12 may be fluid-cooled, and, although not shown, may be coupled to any suitable fluid supply equipment, cooling equipment, and/or any other fluid-handling equipment suitable for use with a melting furnace. In any case, the melting vessel 12 includes a feedstock inlet 19, for example, through the corner wall 17. In the illustrated embodiment, the melting vessel 12 may be part of a submerged combustion melter (SCM) having one or more burners 22 configured to be submerged in a molten material M, e.g., molten glass, during operation of the furnace 10. In other embodiments, the melting vessel 12 may be heated instead, or additionally, by above-melt burners, in-melt electrodes, or by any other devices and configurations suitable to melt feedstock into molten material. The melting vessel 12 may be polygonal, cylindrical, oval, and/or of any other type of configuration suitable for melting feedstock or batch into molten material. A rear perimeter wall 20*b* may include a molten glass outlet 21, such that the outlet 21 is on an opposite end of the melting vessel 12 with respect to the charger 14 and is at a vertical level higher than that of the inlet 19, such that the inlet 19 is below the outlet 21.

The feedstock charger 14 is configured to be in fluid communication with an interior of the melting vessel 12 through one or more of the walls thereof so as to charge feedstock or batch below a free surface of molten material in the melting vessel. As illustrated, the charger 14 may be in fluid communication with the interior of the melting vessel 12 through the corner wall 17 and via the inlet 19. In other embodiments, the charger 14 may be in fluid communication with the interior of the melting vessel 12 through the bottom wall 16 or the perimeter wall 20 of the melting vessel 12.

Figure 2:
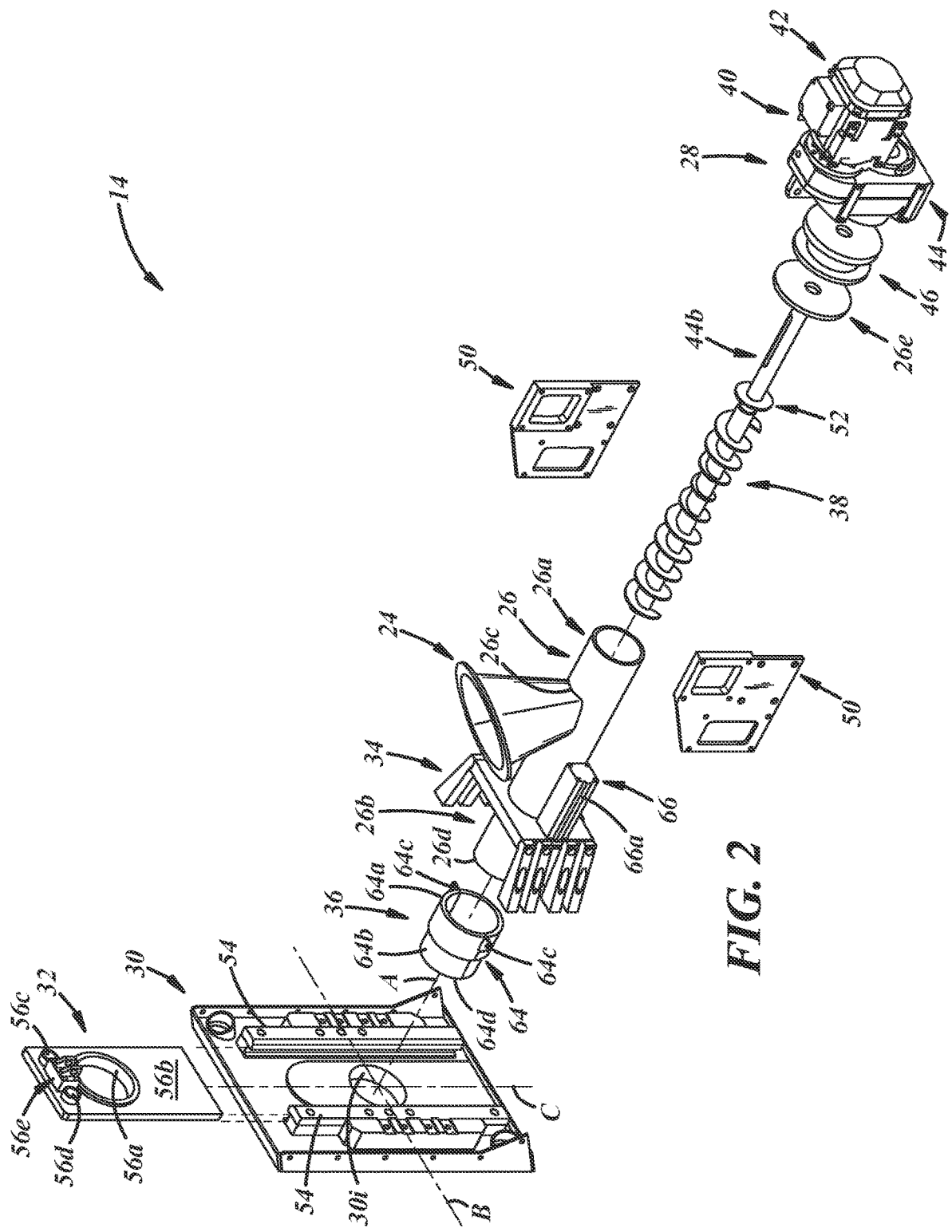
FIG. 2 is an exploded view of the feedstock charger of FIG. 1.

With reference to FIGS. 2 and/or 3, the charger 14 may include an inlet chute 24 to receive feedstock, a charger conduit 26 coupled to the inlet chute 24 to receive feedstock from the inlet chute 24 and direct feedstock into the melting vessel 12, and a feedstock mover 28 coupled to the charger conduit 26 that drives feedstock through the charger conduit 26 toward the melting vessel 12. Also, the charger 14 may include a fluid-cooled panel 30 at a distal end of the charger conduit 26 and through which feedstock may be fed into the melting vessel 12. Further, the charger 14 may include a gate 32 operatively disposed between the charger conduit 26 and the fluid-cooled panel 30 to open and close communication of the charger conduit 26 with respect to the melting vessel 12 (FIG. 1). Additionally, the charger 14 may include a mount 34 that may couple the charger conduit 26 to the fluid-cooled panel 30, and a stripper 36 that may be carried by the mount 34 and the charger conduit 26 to maintain clear communication between the charger conduit 26 and the interior of the melting vessel 12.

The inlet chute 24 may be of circumferentially closed conical or polygonal shape, or of circumferentially open C-shape, V-shape, or U-shape, or of any other shape and configuration suitable to communicate feedstock to the charger conduit 26. The inlet chute 24 may be composed of metal, for example, stainless steel, or of any other material(s) suitable for use with melting furnaces. The inlet chute 24 is coupled to the charger conduit 26 via fastening, welding, or in any other manner suitable for use with melting furnaces. Although not illustrated, the inlet chute 24 may receive feedstock from an upstream hopper, mixer, chute, or any other feedstock handling equipment suitable for use with a melting furnace.

The charger conduit 26, with reference to FIG. 2, is configured to receive feedstock and direct the feedstock in a direction along a longitudinal axis A from an upstream portion 26*a* of the charger conduit 26 toward a downstream or outlet portion 26*b* of the charger conduit 26. The longitudinal axis A intersects a lateral axis B and a normal axis C, which is perpendicular to both the longitudinal and lateral axes A, B. In the illustrated embodiment, the charger conduit 26 is a cylinder or is a cylindrical component of circular transverse cross section. In other embodiments, the charger conduit 26 could be a component having a transverse cross section that is ovular, rectangular, triangular, or of any other suitable shape. The upstream portion 26*a* of the charger conduit 26 may be coupled to the feedstock mover 28 as will be described in further detail herein below. The outlet portion 26*b* may be coupled to the melting vessel 12 via the fluid-cooled panel 30 and the mount 36, as will be described in further detail herein below.

Figure 4:
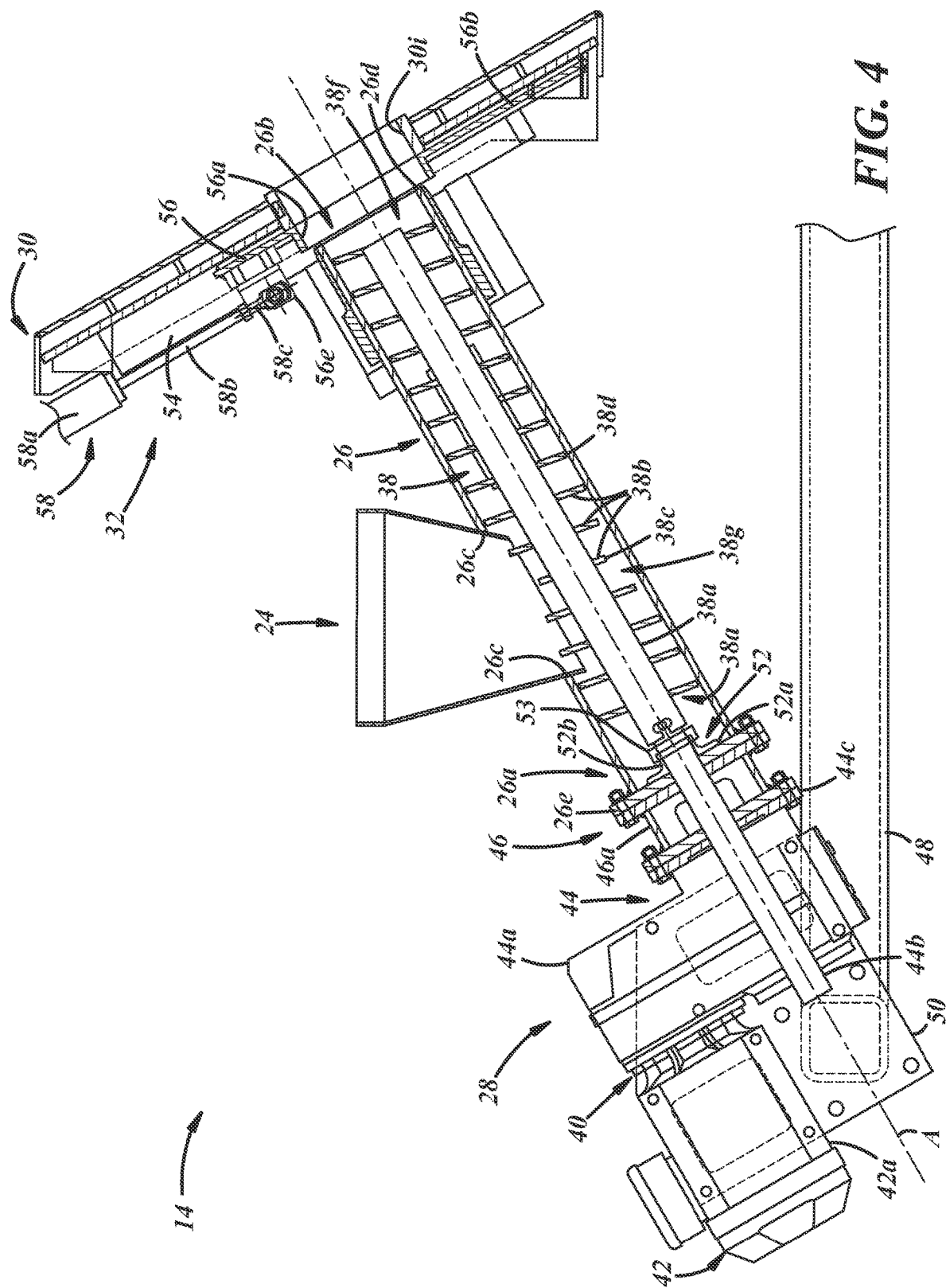
FIG. 4 is a longitudinal cross-sectional view of the feedstock charger of FIG. 1, taken along line 4-4 of FIG. 3.

With reference to FIGS. 4 and/or 5, the charger conduit 26 includes an inlet 26*c* at an intermediate portion of the charger conduit 26 between the upstream and outlet portions 26*a,b* and is in communication with the inlet chute 24. The outlet portion 26*b* of the charger conduit 26 includes an outlet or outlet end 26*d* that terminates the outlet portion 26*b*. The charger conduit 26 may include a single wall sleeve, a multiple wall fluid-cooled assembly, weldment, or extrusion, or any other configuration suitable for use with melting furnaces. The charger conduit 26 also may include a mounting flange 26*e*. The charger conduit 26 may be composed of metal, for example, stainless steel, or any other material(s) suitable for use with melting furnaces.

The feedstock mover 28 may include a movable element 38 that is movable to transmit feedstock in a direction from the charger conduit inlet 26*c* to the charger conduit outlet 26*d*, and an actuator 40 to move the movable element 38. In the illustrated embodiment, the movable element 38 includes an auger but, in other embodiments, the movable element 38 could include a reciprocable piston, or any other movable element suitable for use with melting furnaces. In still other embodiments, the feedstock mover 28 may include pneumatics (not shown), like pneumatic nozzles, to move feedstock or to assist with moving of feedstock through the charger conduit 26. The illustrated auger 38 includes a central shaft 38*a* that may extend along the longitudinal axis A and one or more helical flights 38*b* extending radially away from the central shaft 38*a*. The auger 38 may be composed of metal, for example, stainless steel, or any other material(s) suitable for use with melting furnaces. The helical flights 38*b* have a minimum outer diameter 38*c* over at least a portion of the length of the auger 38. In assembly, the minimum outer diameter 38*c* is configured to be in registration with the inlet 26*c* of the charger conduit 26, for example, to overlap the inlet 26*c* of the charger conduit 26. The helical flights 38*b* also have a maximum outer diameter 38*d* larger in dimension than the minimum outer diameter 38*c*. More specifically, the helical flights 38*b* are greater in outer diameter at an upstream portion 38*e* of the auger 38 and at a downstream portion 38*f* of the auger 38 than they are at an intermediate portion 38*g* of the auger 38.

Figure 6:
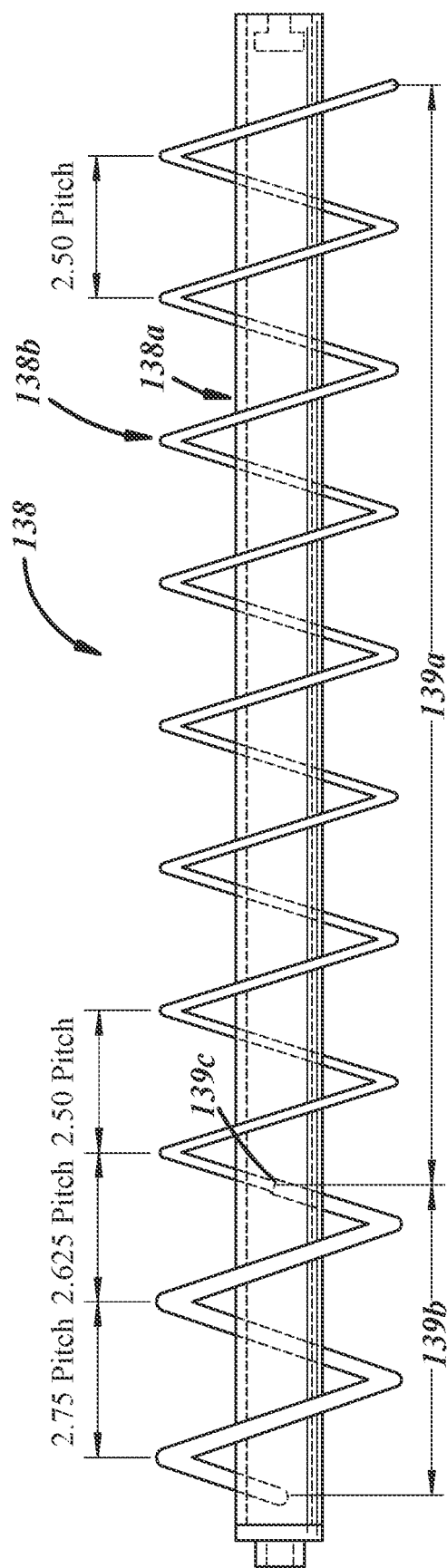
FIG. 6 is a side view of an additional embodiment of an auger for the feedstock charger of FIG. 1.
Figure 7:
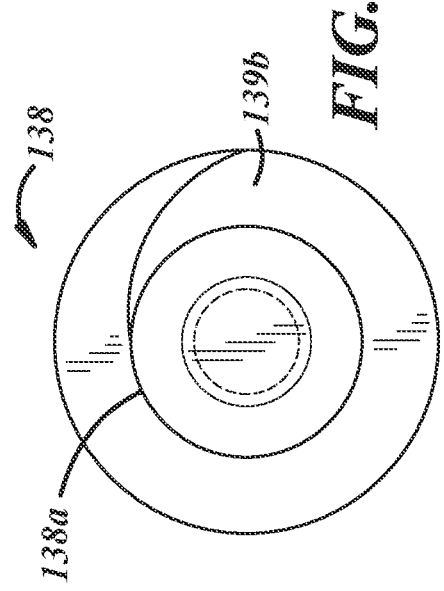
FIG. 7 is an end view of the auger of FIG. 6.

FIGS. 6 and 7 illustrate another embodiment of an auger 138 that includes a central shaft 138*a* and a helical flight 138*b* around the shaft 138*a*. In this embodiment, and with reference to FIG. 6, the helical flight 138*b* includes an upstream section 139*a* and a downstream section 139*b*. An upstream most end of the flight 138*b* is spaced from an upstream most end of the central shaft 138*a*, for example, about 0.75 to 1.5 inches and, more preferably, about 1 inch. Likewise, a downstream most end of the flight 138*b* is spaced from a downstream most end of the central shaft 138*a*, for example, about 0.5 to 1 inches and, more preferably about 0.75 inches. The overall length of the central shaft 138*a* may be about 26 inches, and the maximum diameter of the helical flight 138*b* may be about 4 inches.

The upstream section 139*a* includes an upstream pitch and an upstream thickness, and the downstream section 139*b* includes a downstream pitch different from the upstream pitch and a downstream thickness different from the upstream thickness. The upstream pitch may be, for example, 2.5 inches, and the upstream thickness may be, for example, 0.25 inches. The downstream pitch of the downstream section 139*b* may include a first downstream pitch greater than the upstream pitch, for example, 2.625 inches, and a second downstream pitch greater than the first downstream pitch, for example, 2.75 inches. The downstream thickness of the downstream section 139*b* may be greater than the upstream thickness, for example, 0.5 inches. The different pitches may be provided to compensate for the difference(s) in flight thicknesses and/or diameters between the upstream and downstream sections 139*a,b*.

The thickness refers to the thickness of the flight 138*b* in a direction normal to and between generally axially facing (or upstream and downstream facing) surfaces of the flight 138*b*. The thickness of the downstream section 139*b* may be produced, for example, by applying a coating to an underlying last two pitches of the flight 138*b* that may be a continuation of the flight 138*b* from the upstream section 139*a*. For example, the substrate of the flight 138*b* may be an abrasion resistant steel, for example, AR500, and the coating may include a metal alloy, for instance, COLMONOY 705. More than one coating application, for example, two coating applications, may be desirable to achieve the desired thickness. A blend fillet weld 139*c* may be provided between the downstream thickness and the upstream thickness for a smooth transition therebetween. With reference to FIG. 7, the outer diameter of the downstream most end of the flight 138*b* may be blended to the outer diameter of the central shaft 138*a*.

The actuator 40 of the feedstock mover 28 may include, with continued reference to FIGS. 4 and/or 5, a powertrain, as shown in the illustrated embodiment. In other embodiments, the actuator 40 may include any other device(s) suitable for moving the movable element of the feedstock mover. The powertrain may include a motor 42, a geartrain 44 coupled to and driven by the motor 42, and a conduit coupling 46 to couple the geartrain 44 to the charger conduit 26.

The motor 42 includes a housing 42*a* that may be supported by upstream ends of one or more beams 48*a,b* via one or more powertrain mounts 50, which also may be coupled to the geartrain 44. Downstream ends of the beam(s) 48*a,b* may be coupled to the melting vessel 12 (FIG. 1), supporting framework for the melting vessel 12, or any other structure suitable to support the feedstock charger 14. The illustrated motor 42 is an electric motor, but may be a pneumatic or hydraulic motor in other embodiments.

The geartrain 44 includes, with continued reference to FIGS. 4 and/or 5, a geartrain housing 44*a*. And, although not shown, the geartrain 44 also includes gears, belts, pulleys, sheaves, and/or any other such torque multiplying components carried in the housing 44*a* for multiplying torque output from the motor 42, and an input coupling to couple the torque multiplying components to an output shaft of the motor 42. The geartrain 44 also includes a geartrain output shaft 44*b* to couple the torque multiplying components to the auger central shaft 38*a* at the upstream portion 38*e* of the auger 38. The geartrain output shaft 44*b* may be a solid or tubular shaft fit inside the auger central shaft 38*a*, which itself may be tubular at least at the upstream portion 38*e* thereof, and which may be pinned, press-fit, fastened, and/or otherwise coupled against relative rotation to the geartrain output shaft 44*b*. The geartrain housing 44*a* also may include a mounting flange 44*c* for mounting to the conduit coupling 46.

The conduit coupling 46 may include the geartrain housing mounting flange 44*c* at an upstream end, the conduit mounting flange 26*e* at a downstream end, an intermediate housing 46*a*, and mounting flanges 46*b,c* for coupling, respectively, to the geartrain housing flange 44*c* and to the charger conduit flange 26*e*. The conduit coupling 46 also may include a shaft seal or escutcheon 52 carried by and surrounding the geartrain output shaft 44*b* to prevent ingress of feedstock into the housing 46*a* of the conduit coupling 46 and/or the geartrain 44. The escutcheon 52 may include a flange 52*a* seated against a downstream facing surface of the conduit mounting flange 26*e* and a hub 52*b* extending axially from the flange 52*a* and along a portion of the geartrain output shaft 44*b*. A clamp 53 may be used to couple the escutcheon 52 to the output shaft 44*b*.

Figure 8:
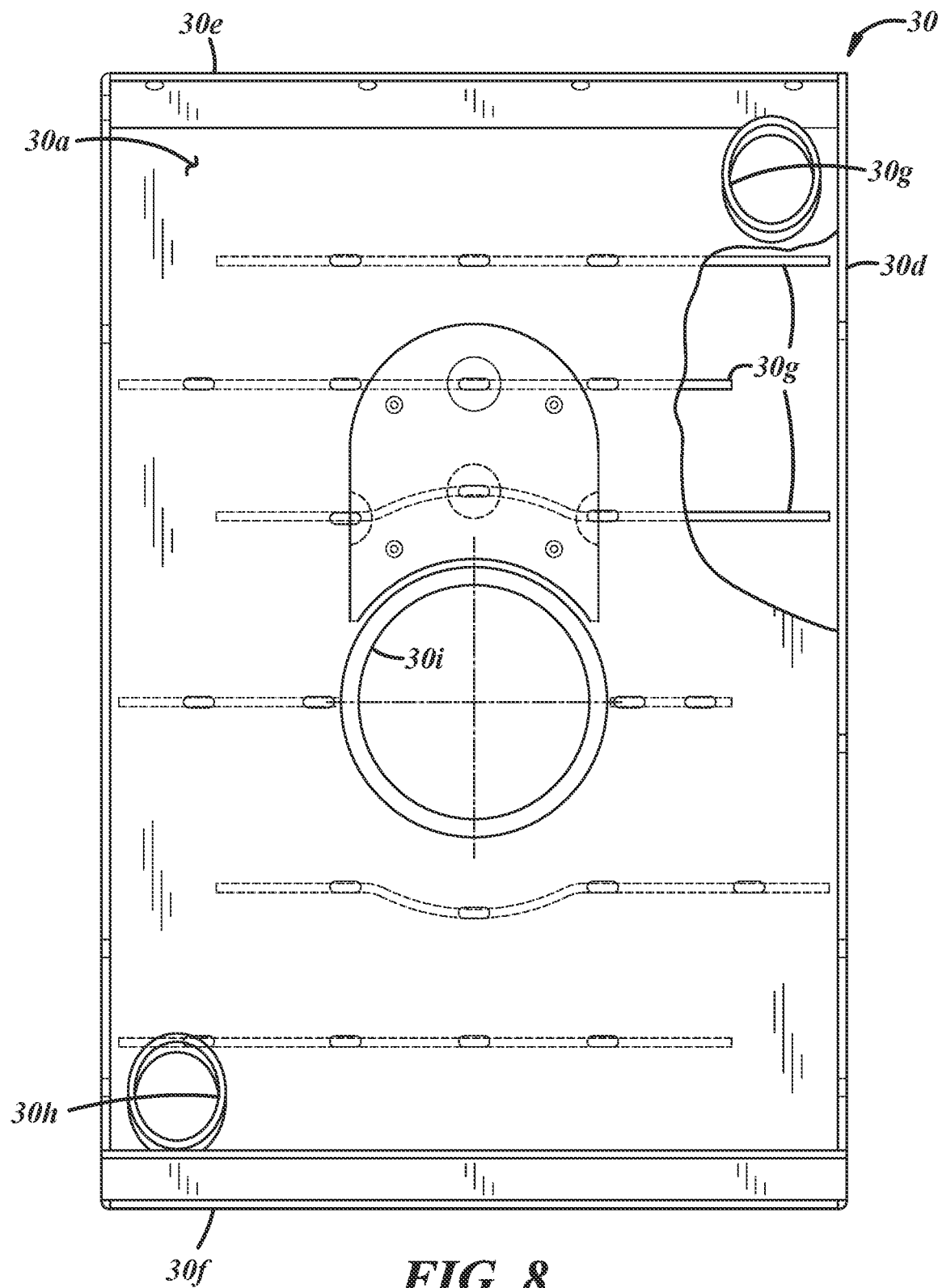
FIG. 8 is a fragmentary rear view of a fluid-cooled panel of the feedstock charger of FIG. 1.

The fluid-cooled panel 30 includes, with reference to FIG. 8, an outside wall 30*a*, an inside wall 30*b* (FIG. 4), side walls 30*c,d* extending between the outside and inside walls 30*a,b*, and end walls 30*e,f* extending between the outside and inside walls 30*a,b* and between the side walls 30*c,d*. The panel 30 also includes internal baffles 30*g* extending between the outside and inside walls 30*a,b* to define a serpentine flow path, an inlet 30*g* to receive cooling fluid into the flow path, and an outlet 30*h* to transmit cooling fluid from the flow path out of the panel 30. The panel 30 also has a fixed feedstock aperture 30*i* through which feedstock is communicated into the melting vessel. Although not shown, the panel 30 may be coupled to any suitable fluid supply equipment, cooling equipment, and/or any other fluid-handling equipment suitable for use with a melting furnace. Also, the various components of the panel 30 may be composed of metal, for example, stainless steel, or any other material(s) suitable for use with a melting furnace, and the various components of the panel may be stamped, bent, cut, welded, and/or constructed in any other manner suitable for use with melting furnaces.

Figure 5:
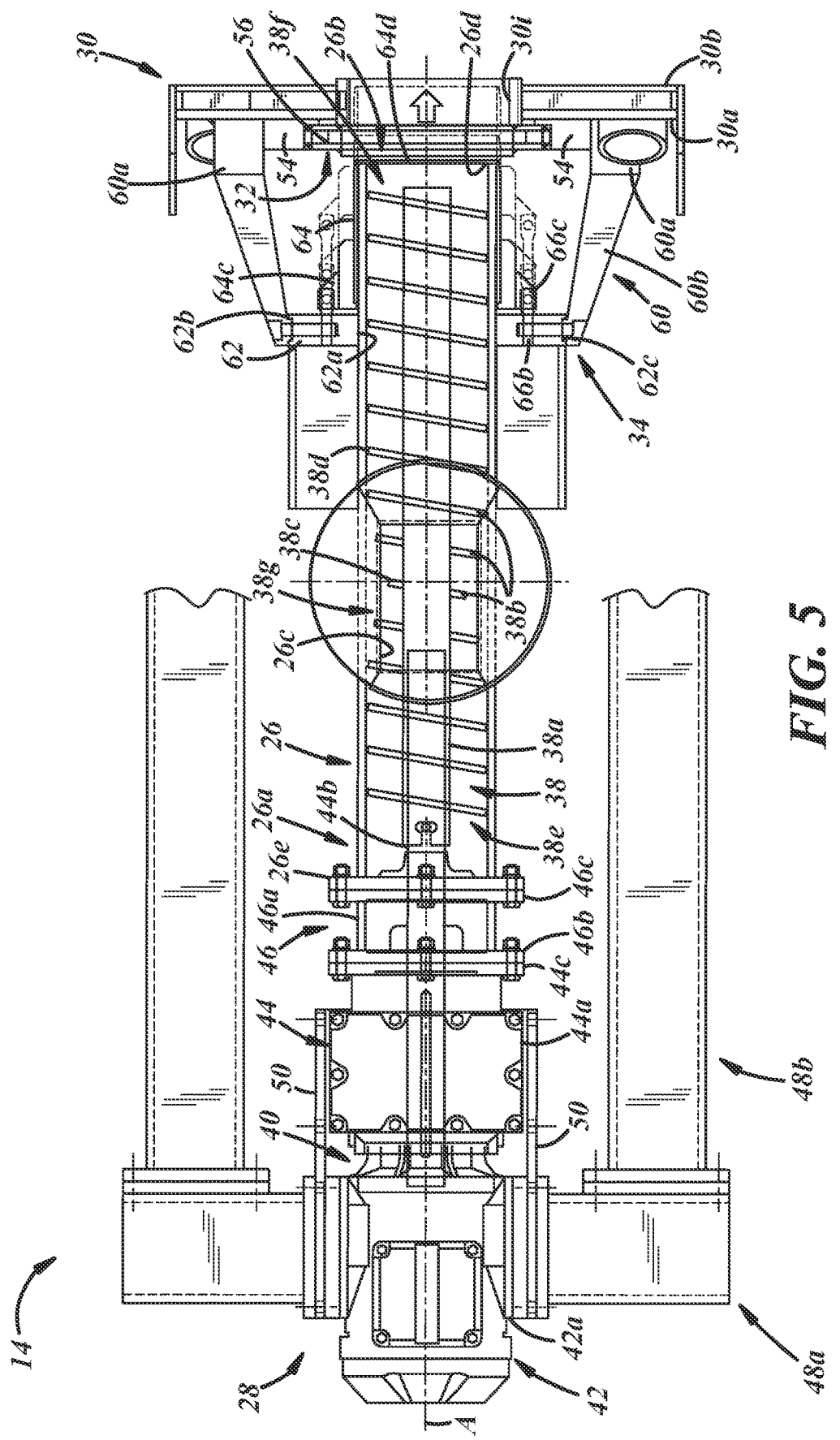
FIG. 5 is a fragmentary top view of the feedstock charger of FIG. 1.

With reference to FIG. 5, the illustrated gate 32 intersects the longitudinal axis A of the charger conduit 26, and is configured to reciprocate back and forth along the normal axis C (FIG. 2) to close the charger conduit 26, and to open the charger conduit 26 during charging of feedstock into the melting vessel 12. The gate 32 is detachably coupled to the charger conduit 26 and is configured to be coupled to a panel of the melting vessel 12, for example, the corner wall 17 (FIG. 1) of the melting vessel 12. In the illustrated embodiment, the fluid-cooled panel 30 of the charger 14 is, or constitutes a portion of, the corner wall 17. The gate 32 includes, in the illustrated embodiment, mounting rails 54 that may be coupled directly to the outside wall 30*a* of the fluid-cooled panel 30, a closure 56 slidably mounted between the mounting rails 54, and at least one actuator 58 (FIG. 4) to translate the closure 56 along the mounting rails 54 between open and closed positions. The mounting rails 54 are configured to be coupled to fluid-cooled panel 30, for example, via fastening, welding, or any other coupling technique suitable for use with melting furnaces. The closure 56 may include a single-walled solid plate, a multiple-walled fluid-cooled panel, or any other configuration suitable for use with a melting furnace. The closure 56 includes a feed aperture 56a (FIG. 4) for selective registration with the feed aperture 30i of the fluid-cooled panel 30, and a wall 56b (FIGS. 2 and 4) for selective obstruction of the feed aperture 30i of the fluid-cooled panel 30, to selectively open, and close, the gate 32. With reference to FIG. 2, the closure 56 also may include a cooling fluid inlet 56c and outlet 56d, and an actuator coupling 56e such as a block clevis, or any other coupling suitable for use with melting furnaces. With reference to FIG. 4, the gate actuator 58 may include a pneumatic or hydraulic cylinder, which may include a cylinder housing 58a, and a piston 58b having a closure coupling 58c, for instance, a piston rod clevis or any other coupling suitable for use with melting furnaces. The piston closure coupling 58c is for coupling to the actuator coupling 56e of the closure 56. In other embodiments, the gate actuator 58 may include an electric motor, or any other actuating devices suitable for use with melting furnaces.

With reference to FIG. 5, the mount 34 may be used to couple the fluid-cooled panel 30 and/or the gate 32 to the charger conduit 26 and may include one or more gate brackets 60 coupled to the gate 32, and one or more conduit brackets 62 coupled to the conduit 26, wherein the conduit brackets 62 are coupled to the gate bracket(s) 60. The gate bracket(s) 60 may include bracket bases 60a coupled to the gate rails 54 and/or the fluid-cooled panel 30, and bracket arms 60b coupled to the bracket bases 60a and extending rearwardly therefrom. The conduit bracket 62 includes a conduit aperture 62a extending therethrough to accommodate the charger conduit 26. The bracket 62 may be a single plate or may be constructed of multiple plates coupled to one another. In any event, the conduit bracket 62 includes sides 62b,c. In the illustrated embodiment, there are a plurality of bracket arms 60b on either side of the mount 34, for instance, four arms 60b on either side, wherein the arms 60b have rear ends fastened to the sides 62b,c of the conduit bracket 62.

Figure 3:
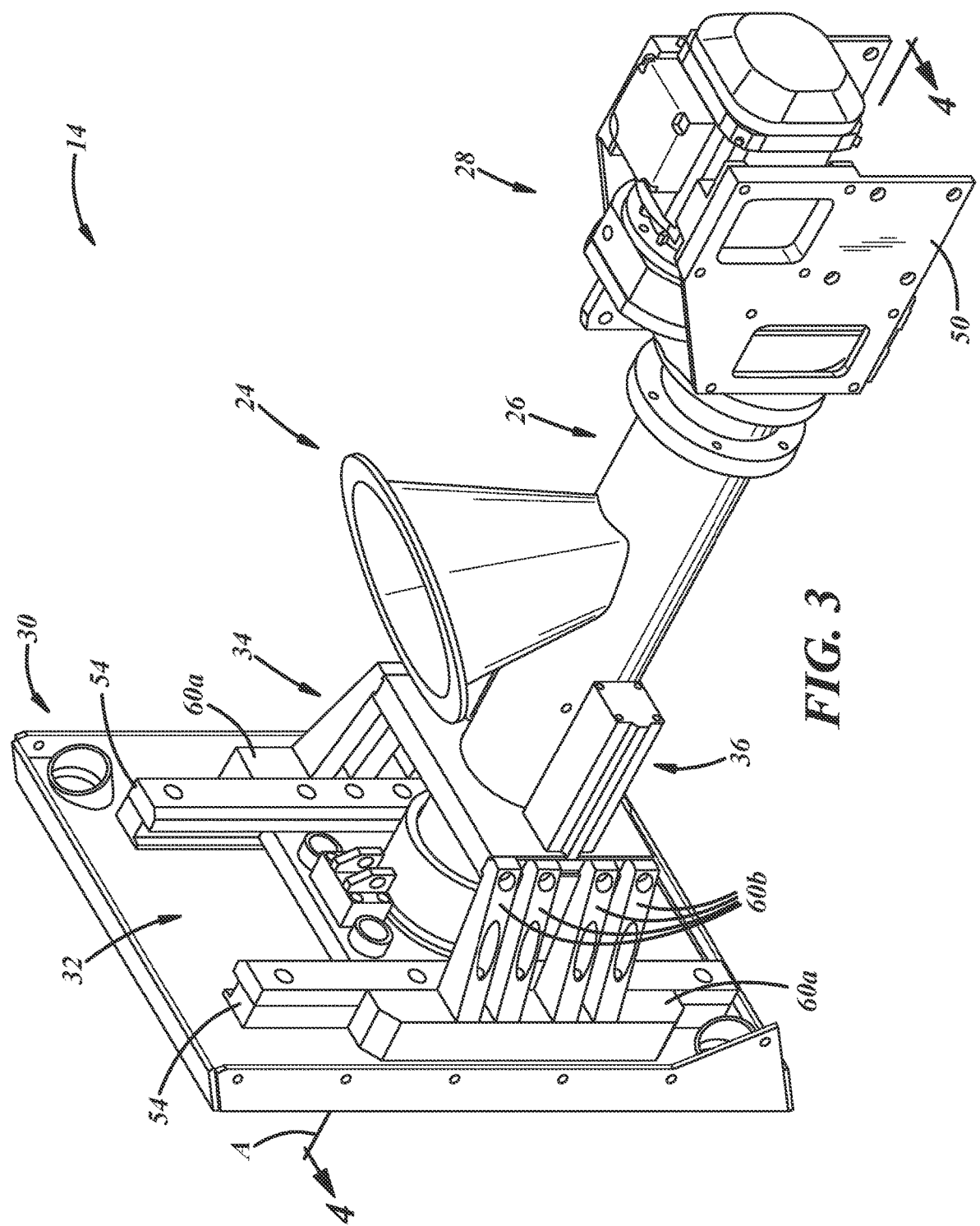
FIG. 3 is an enlarged perspective view of the feedstock charger of FIG. 1.

With reference to FIG. 3, in the illustrated embodiment, the gate and conduit brackets 60, 62 include multiple separate components but, in other embodiments, the brackets 60, 62 could be constituted by fewer components or even a single, integral component. Also, the various components of the gate 32 may be composed of metal, for example, stainless steel, or any other material(s) suitable for use with a melting furnace.

The stripper 36 includes, with reference to FIG. 2, a stripping tool 64 that may be movably carried by the charger conduit 26, and one or more actuators 66 coupled to the stripping tool 64 to move the stripping tool 64 with respect to the charger conduit 26. In the illustrated embodiment, the stripping tool 64 is translatably disposed around the outlet portion 26b of the charger conduit 26, and may be of cylindrical shape with circular transverse cross section as illustrated, or may be of any other shape corresponding to the shape of the charger conduit 26. Also, the stripping tool 64 includes a rearward end 64a having a rearward outer diameter, and a forward end 64b having a forward outer diameter smaller than the rearward outer diameter and extendable into and through the fixed and translatable feed apertures 30i, 56a of the fluid-cooled panel 30 and the gate 32. The stripping tool 64 also may include actuator couplings 64c for coupling to the stripper actuator(s) 66. The stripper actuator(s) 66 may include pneumatic or hydraulic cylinders, which may include cylinder housings 66a, and pistons 66b (FIG. 5) having stripper couplings 66c for coupling to the actuator couplings 64c of the stripping tool 64. In other embodiments, the stripper actuators 66 may include electric motors, or any other actuating devices suitable for use with melting furnaces.

In operation, and with reference to FIG. 2, the actuator 40 of the feedstock mover 28 is activated to rotate the auger 38 in a feed forward direction, and feedstock is fed into the inlet chute 24 in any suitable manner so that the feedstock is received into the charger conduit 26 via the inlet 26c thereof. The rotation of the auger 38 pushes the feedstock toward the outlet 26d of the charger conduit 26.

With reference to FIG. 4, the gate actuator 58 may be energized to retract the gate closure 56 and thereby open the gate 32 so that the interior of the charger conduit 26 is in open communication with the interior of the melting vessel 12 (FIG. 1) via the registered feed apertures 30i, 56a of the fluid-cooled panel 30 and the gate closure 56 and so that feedstock flows into the melting vessel 12. In one embodiment, and with reference again to FIG. 2, the stripper actuator 66 may be activated to advance the stripping tool 64 toward the interior of the melting vessel 12 from its retracted position, and into at least the gate closure feed aperture 56a, if not entirely through the gate closure feed aperture 56a and into the panel feed aperture 30i. Either way, the stripper 36 can act as a funnel or guide to facilitate entry of feedstock into the melting vessel 12.

With reference to FIG. 5, the stripper actuator 66 may include three positions: a fully retracted position to facilitate closure of the gate 32; a fully advanced position to facilitate stripping of the feed apertures 30i, 56a; and an intermediate position to facilitate feeding of feedstock from the charger conduit 26 through the gate 32 and panel 30. A stroke length from the fully retracted position to the fully advanced position may be, for example, two to four inches, and preferably three inches. A stroke length from the fully retracted position to the intermediate position may be, for example, half an inch to two inches, and preferably one inch.

With reference to FIG. 1, the submerged combustion burners 22 of the melting furnace 12 melt the feedstock in the melting vessel 12, and the feedstock charger 14 continues to charge feedstock into the melting vessel 12 through the charger conduit 26, the gate 32, and the fluid-cooled panel 30.

With reference to FIG. 2, when it is desired to stop charging feedstock into the melting vessel 12, the stripper actuator 66 may be activated to retract the stripping tool 64 out of the panel and gate closure feed apertures 30i, 56a, and the gate 32 may be actuated to move the gate closure 56 to a closed position to prevent molten material from flowing into the charger conduit 26. Likewise, the actuator 40 of the feedstock mover 28 may be deactivated to stop conveying feedstock toward the charging conduit outlet 26d.

When it is desired to restart the charging of the feedstock into the melting vessel 12, the actuator 40 of the feedstock mover 28 may be reactivated to push feedstock toward the charging conduit outlet 26d, the gate 32 may be actuated to move the gate closure 56 back to the open position, and the stripper actuator 66 may be activated to advance the stripping tool 64 into at least the gate closure feed aperture 56a, if not also the panel feed aperture 30i, to communicate feedstock into the melting vessel 12 through the gate 32 and the fluid-cooled panel 30.

When one or both of the feed apertures 30i, 56a become clogged with feedstock and/or molten material, the stripper actuator 66 is energized to advance the stripping tool 64 through the apertures 30i, 56a of the fluid-cooled panel 30 and the gate 32 to strip clogged feedstock and/or molten material away therefrom. The stripper actuator 66 may be activated to advance the stripping tool 64 from its fully retracted or intermediate positions to its fully advanced position. In any case, the stripping tool 64 is advanced along the charger conduit 26 to a position in which a stripping end 64d of the stripping tool 64 extends beyond the outlet end 26d of the charger conduit 26 and into and through the feed apertures 30i, 56a, as depicted in phantom lines in FIG. 5. Those of ordinary skill in the art will recognize that power supplies, fluid supplies, valves, conduit, controllers, and the like of any type suitable for use with a melting furnace may be used to energize or activate the powertrain, the gate actuator(s), and/or the stripper actuator(s).

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A melting furnace feedstock charger, comprising:
 a charger conduit including an inlet to receive feedstock into the charger conduit and an outlet at an outlet portion of the charger conduit to transmit feedstock out of the charger conduit;
 a feedstock mover coupled to the charger conduit to convey feedstock in a direction from the inlet toward the outlet; and
 a gate detachably coupled to the charger conduit and including a gate closure having a movable feed aperture and a closure wall; and
 a stripper including
  a stripping tool movably carried by the charger conduit; and
  at least one actuator coupled to the stripping tool to move the stripping tool with respect to the charger conduit, wherein the stripping tool is translatably disposed around the outlet portion of the charger conduit.

2. The feedstock charger of claim 1, further comprising a fluid-cooled panel including a fixed feed aperture for selective registration with the movable feed aperture of the gate closure.

3. The feedstock charger of claim 2, wherein the gate includes mounting rails coupled to the fluid-cooled panel, wherein the gate closure is slidably mounted between the mounting rails.

4. The feedstock charger of claim 2, wherein the gate is fluid-cooled.

5. The feedstock charger of claim 1, further comprising a charger conduit mount including a conduit bracket coupled to the charger conduit, and a gate bracket coupled to the gate, wherein the conduit bracket is coupled to the gate bracket.

6. The feedstock charger of claim 5, wherein the conduit bracket and gate bracket are separate components.

7. The feedstock charger of claim 1, wherein the stripping tool includes a rearward end having a rearward outer diameter, and a forward end having a forward outer diameter smaller than the rearward outer diameter and extendable into and through a fixed feed aperture of a fluid-cooled panel and the movable feed aperture of the gate.

8. The feedstock charger of claim 1, wherein the feedstock mover includes an auger having a central shaft and at least one helical flight carried around the central shaft.

9. The feedstock charger of claim 8, wherein the at least one helical flight has an outer diameter of varying size over at least a portion of the length of the at least one helical flight, including a minimum outer diameter that longitudinally overlaps the inlet of the charger conduit.

10. The feedstock charger of claim 9, wherein the maximum diameter of the helical flight is 4 inches and a length of the central shaft is 26 inches.

11. The feedstock charger of claim 8, wherein the at least one helical flight includes an upstream section and a downstream section, wherein the upstream section includes an upstream pitch and an upstream thickness and the downstream section includes a downstream pitch different from the upstream pitch and a downstream thickness different from the upstream thickness.

12. The feedstock charger of claim 11, wherein the downstream section includes a metal alloy coating on an underlying last two pitches of the auger.

13. The feedstock charger of claim 8, further comprising a feedstock mover actuator including a motor, a geartrain coupled to and driven by the motor, a conduit coupling to couple the geartrain to the charger conduit, a geartrain output shaft coupling the geartrain to the auger central shaft, and a shaft seal carried by at least one of the geartrain output shaft or the auger central shaft and seated against a downstream facing surface of a mounting flange of the conduit coupling to prevent ingress of feedstock into the geartrain.

14. The feedstock charger of claim 8, further comprising a feedstock mover actuator including a motor, a geartrain coupled to and driven by the motor, a conduit coupling to couple the geartrain to the charger conduit, a geartrain output shaft coupling the geartrain to the auger central shaft, and an escutcheon, wherein the escutcheon has a flange seated against a downstream facing surface of a mounting flange and a hub extending axially from the flange and along a portion of the geartrain output shaft to prevent ingress of feedstock into the geartrain.

15. A submerged combustion melter, comprising:
 a melter vessel including a bottom wall, a top wall, at least one perimeter wall extending in a direction between the bottom wall and the top wall, and a corner wall between the bottom wall and the at least one perimeter wall; and
 the feedstock charger of claim 1 coupled to at least one corner wall.

16. The melting furnace feedstock charger of claim 1, wherein the charger conduit is configured to transmit feedstock along a longitudinal axis (A), and wherein the stripper facilitates transmission of feedstock and/or is configured to strip away clogged feedstock and/or molten material.

17. The feedstock charger of claim 1, wherein the feedstock mover includes a reciprocal piston.

18. A method of using a melting furnace feedstock charger, the method comprising:
 passing feedstock through a melting furnace feedstock charger having a charger conduit with an inlet, and an outlet end at an outlet portion of the charger conduit to transmit feedstock out of the charger conduit, a feedstock mover coupled to the charger conduit to convey feedstock in a direction from the inlet toward the outlet end, and a gate detachably coupled to the charger conduit and including a gate closure having a movable feed aperture and a closure wall; and translating a stripping tool along the charger conduit to a position in which a stripping end of the stripping tool extends beyond the outlet end of the charger conduit, wherein the stripping tool is movably carried by and translatable along the charger conduit and at least one actuator is coupled to the stripping tool to move the stripping tool with respect to the charger conduit, wherein the stripping tool is translatably disposed around the outlet portion of the charger conduit.

19. The method of claim 18, wherein the step of translating the stripping tool includes actuating the stripping tool when feedstock and/or molten material accumulates at the outlet portion in order to clear the feedstock and/or molten material from the outlet portion.

\* \* \* \* \*